R. C. HESS.
FENCE FABRIC.
APPLICATION FILED AUG. 21, 1911.
1,035,965.
Patented Aug. 20, 1912.
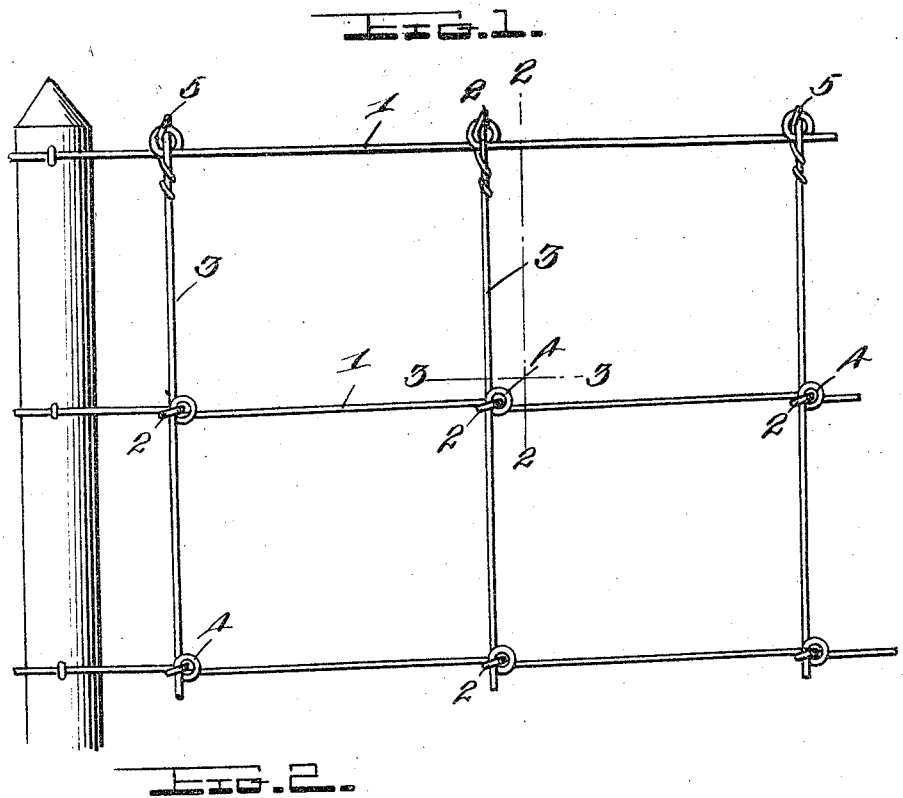
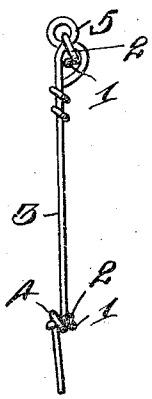
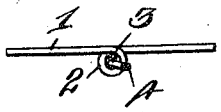
Inventor
R. C. Hess,
Witnesses
By Watson E. Coleman
Attorney

UNITED STATES PATENT OFFICE.

ROBERT C. HESS, OF BELOIT, KANSAS.

FENCE FABRIC.

1,035,965.  Specification of Letters Patent.  Patented Aug. 20, 1912.

Application filed August 21, 1911. Serial No. 645,147.

*To all whom it may concern:*

Be it known that I, ROBERT C. HESS, a citizen of the United States, residing at Beloit, in the county of Mitchell and State of Kansas, have invented certain new and useful Improvements in Fence Fabrics, of which the following is a specification, reference being had to the accompanying drawings.

This invention relates to wire fences and has for its object to provide a new and novel fence fabric.

A further object of the invention is to produce a fabric for wire fences wherein the line and stay wires are securely fastened at their points of intersection.

A still further object of the invention is to produce a fence of this character which will permit the insertion of new line and stay wires to replace those which may become accidentally broken.

With the above and other objects in view, this invention resides in the novel features of construction, combination and arrangement of parts, as will be more fully hereinafter described, claimed, and illustrated in the accompanying drawings, in which, Figure 1 is a side elevation of a portion of the fence fabric, the line wires being secured to a post; Fig. 2 is a sectional view on the line 2—2 of Fig. 1; Fig. 3 is a similar view on the line 3—3 of Fig. 1.

Referring to the drawings, the numeral 1 designates the longitudinal line wires which are each formed from single lengths and are provided intermediate their ends with a plurality of spaced horizontally arranged loops 2. The drawing shows the fabric as composed of three line wires 1, but it will be understood that the number of such wires may be varied to suit different sizes of fences. The fabric further consists of a plurality of stay wires 3, each of which is formed intermediate its ends with vertical loops 4, said loops being adapted to interlock with the loops 2 of the line wires 1, whereby the line wires and stay wires are securely locked at their points of intersection, thus obviating the necessity of soldering or welding the line wires and stay wires at their connecting point, as is customary in such devices. Particular attention is called to the fact that the wires 3 are twice passed through the loops 2 of the line wires in the formation of the loops 4 in said strand wires. By means of this connection a very strong and durable fabric is obtained and the opening of the loops 2 and 4 by strains upon the wires is effectually prevented.

It will be noted that the uppermost line wire 1 is so formed that the loops thereof are vertically inclined so that the upper ends of the stay wires 3 may be conveniently secured therein. The upper ends of the stay wires 3 are passed through the loops 2 of the upper line wire 1 and are then bent to form loops 5 near their upper ends, the extreme ends of each stay wire being passed through the loops 2 in the upper line wire 1 and thence downwardly. Said ends are then wrapped around the stay wires to form a rigid connection at the upper edge of the fabric. The line wires 1 are secured to the fence posts by stapling or in any manner desired.

From the foregoing description it will be seen that a fence fabric has been produced which is not only simple in construction but one which may be easily and quickly assembled without the aid of soldering or welding and one in which the weaving of the fabric may be varied to suit different uses.

Having thus described my invention, what I claim as new and desire to secure by Letters-Patent is:

1. A fence wire fabric comprising a series of spaced longitudinal line wires, certain of said wires having spaced loops formed therein disposed in a horizontal plane, and another of the line wires also being provided with spaced loops disposed in vertical planes, a series of stay wires arranged in spaced relation and extending at right angles to the line wires, said stay wires being connected at a point intermediate of their ends to the loops of the first-named line wires, the ends of the stay wires being passed through the vertically disposed loops of the last-named line wire and returned upon themselves to form loops therein which are disposed above the loops of said line wire, the ends of said stay wires extending from said loops and through the loops of the line wire and having their extremities twisted upon the stay wires to form a second loop therein to closely confine the loops of the line wire and prevent their movement with relation to the loops in the ends of the stay wires.

2. A wire fence fabric comprising a series of spaced longitudinal line wires each having formed therein a plurality of spaced loops, a series of stay wires also arranged in spaced relation and extending at right angles to the line wires, said stay wires having spaced loops formed therein disposed through the loops of certain of the line wires, the upper ends of said stay wires being disposed through the loops on the upper line wire and bent upon themselves to form loops therein, the ends of said stay wires being then again passed through the loops of said line wire and having their extremities secured upon the body portion of the stay wires to securely hold the loops of the line wire in the loops on the upper ends of said stay wires.

In testimony whereof I hereunto affix my signature in the presence of two witnesses.

ROBERT C. HESS.

Witnesses:
    GEORGE D. PICKLER,
    M. A. WONES.